March 15, 1966 J. W. HICKS, JR 3,240,987
METAL AND GLASS FIBER STRUCTURES AND ELECTRICAL
DEVICES USING SAME
Filed Aug. 28, 1961 8 Sheets-Sheet 1
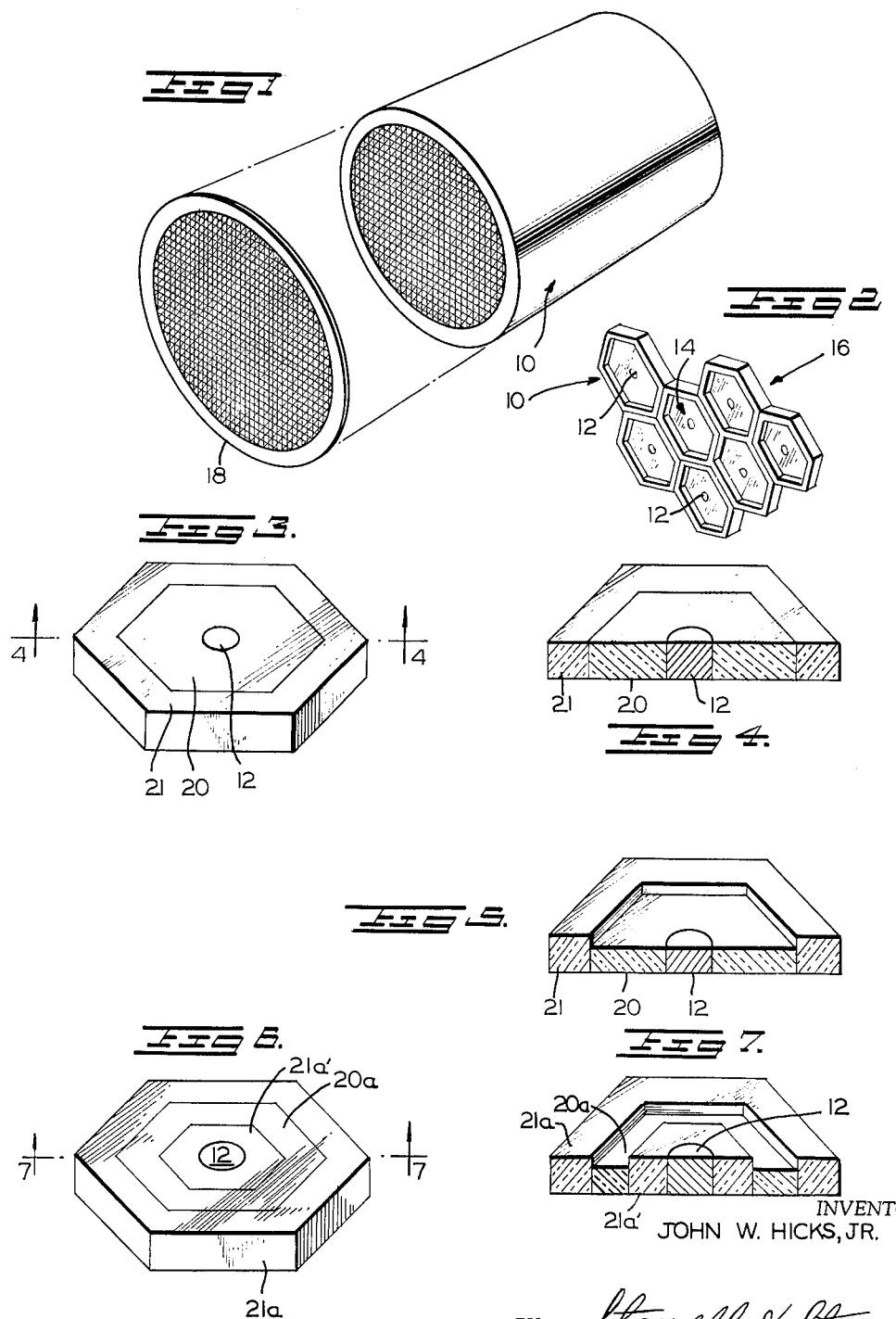
INVENTOR
JOHN W. HICKS, JR.
BY Stowell & Stowell
ATTORNEY

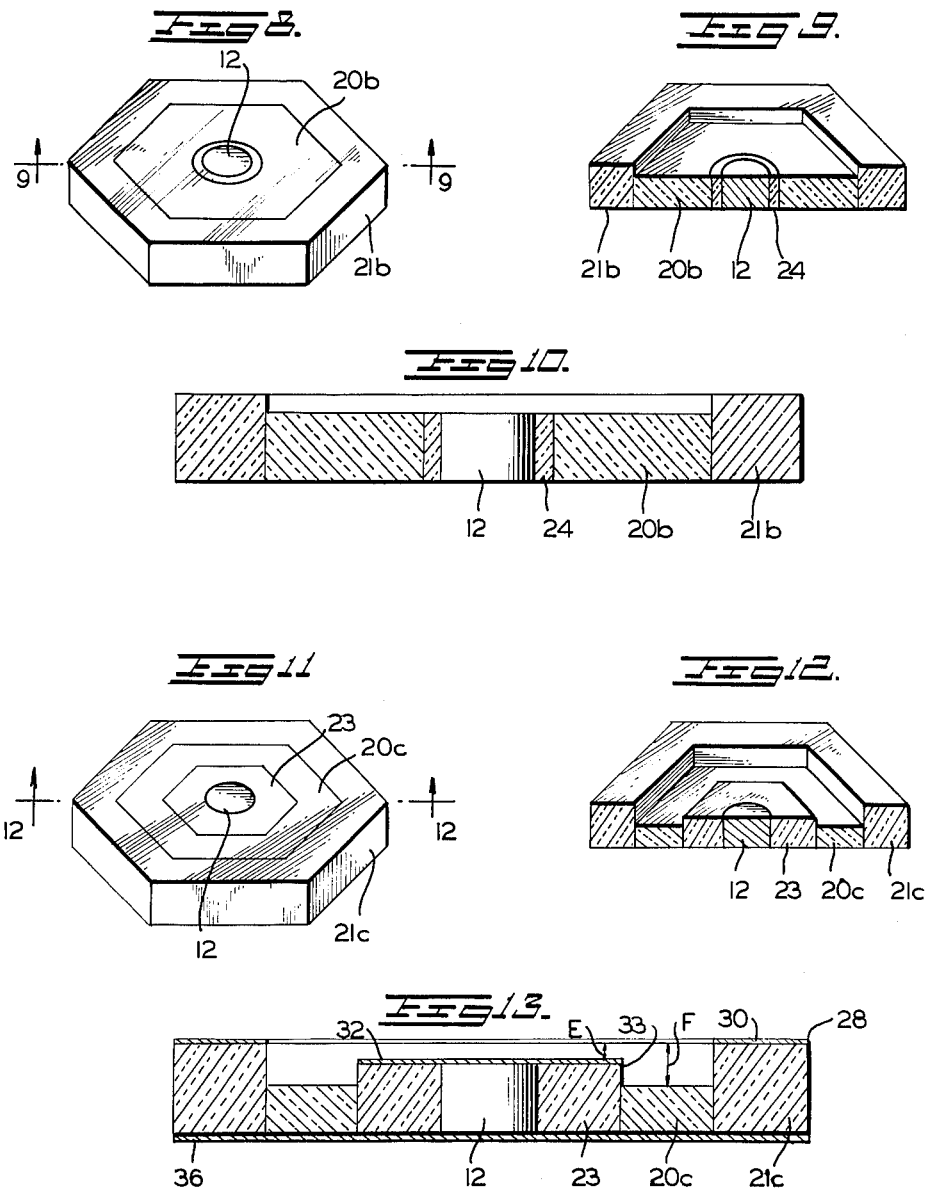

March 15, 1966 J. W. HICKS, JR 3,240,987
METAL AND GLASS FIBER STRUCTURES AND ELECTRICAL
DEVICES USING SAME
Filed Aug. 28, 1961 8 Sheets-Sheet 3
FIG. 14.
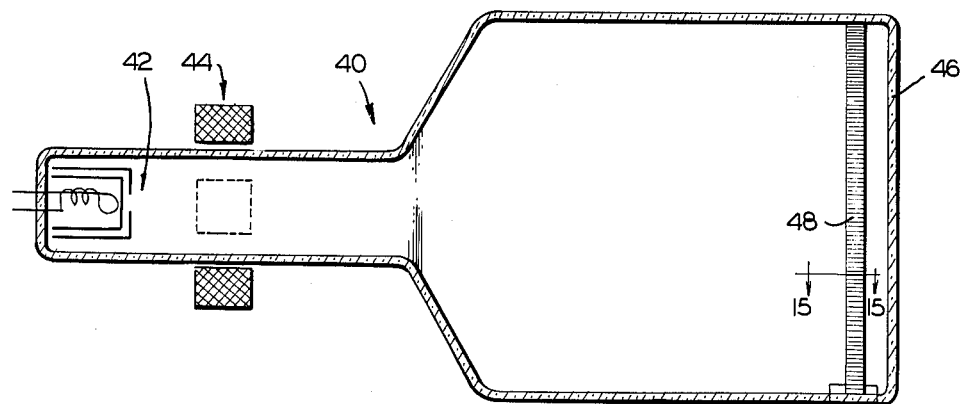
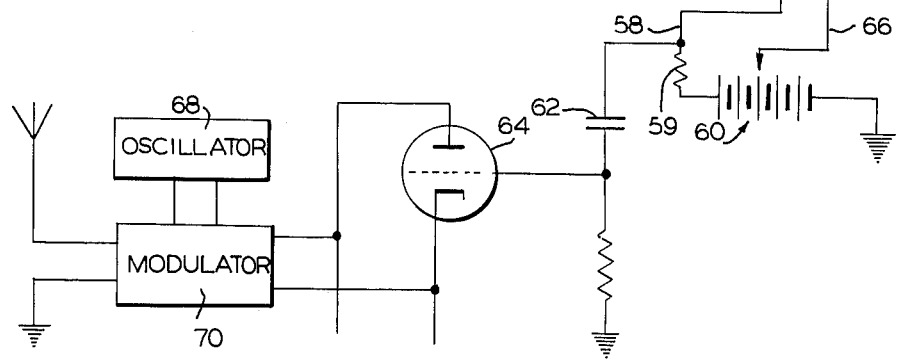
FIG. 15.
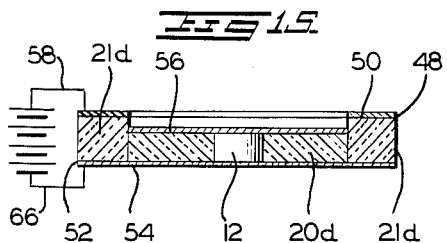
FIG. 16.
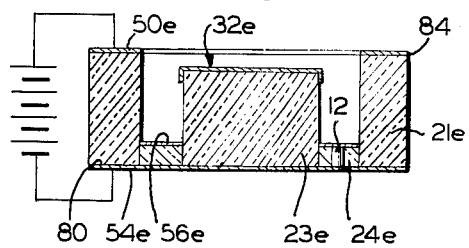
INVENTOR
JOHN W. HICKS, JR.
BY *Stowell & Stowell*
ATTORNEY

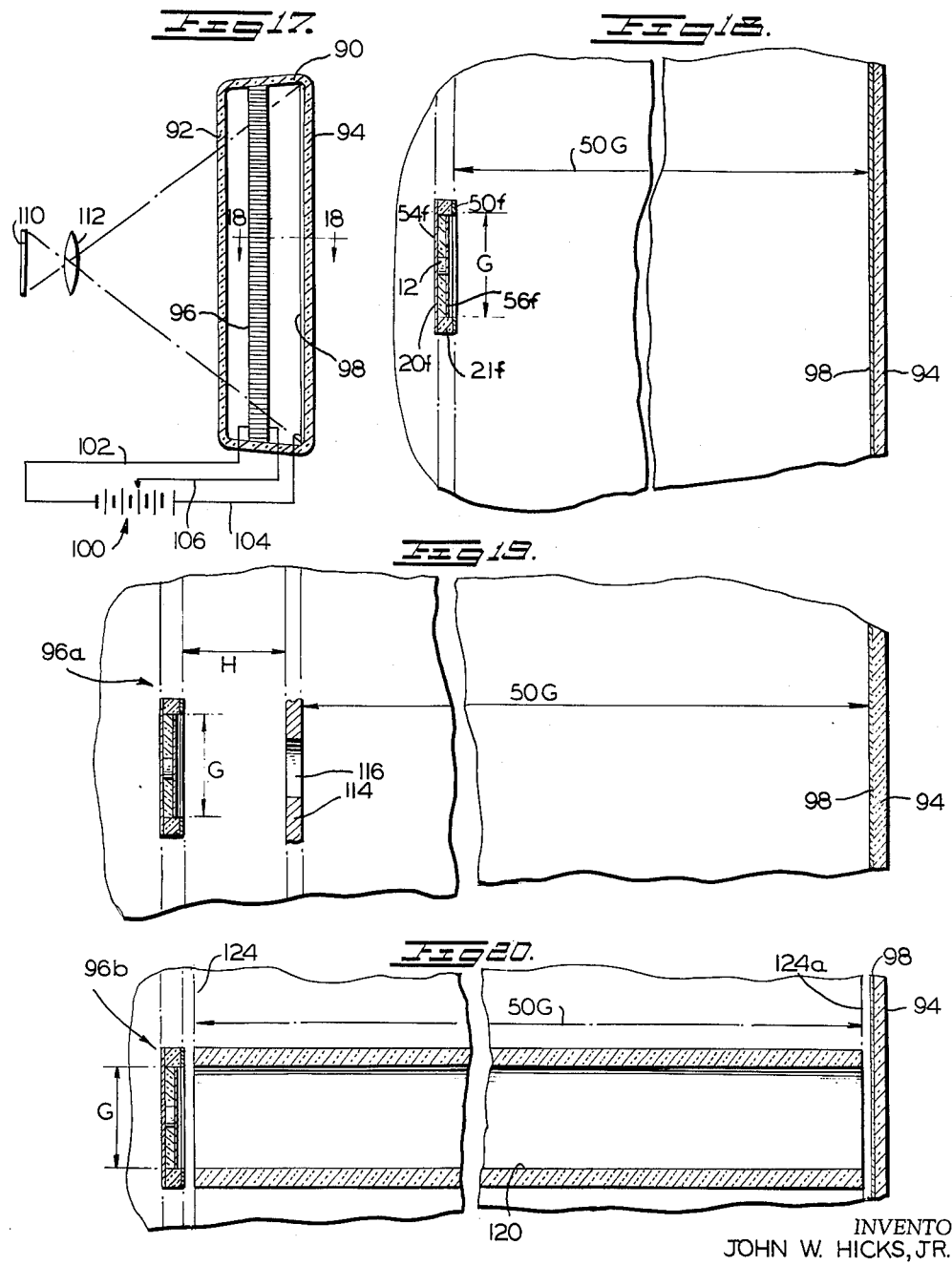

March 15, 1966  J. W. HICKS, JR  3,240,987
METAL AND GLASS FIBER STRUCTURES AND ELECTRICAL
DEVICES USING SAME
Filed Aug. 28, 1961  8 Sheets-Sheet 5
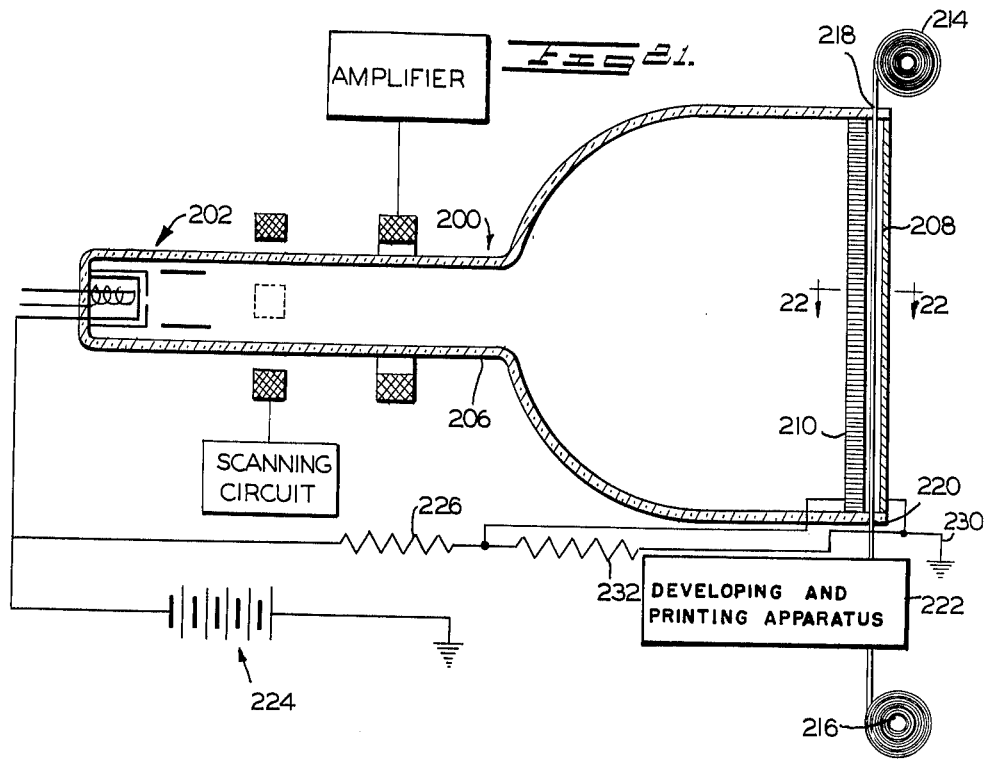
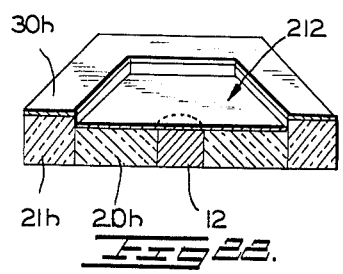
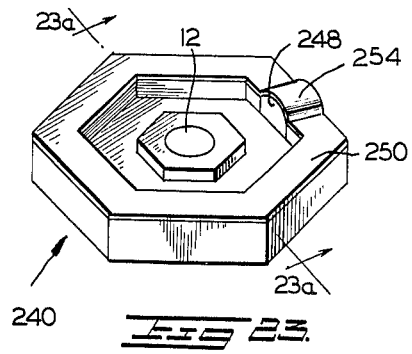
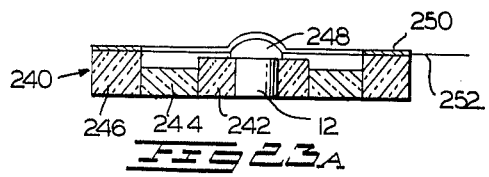
INVENTOR
JOHN W. HICKS, JR.
BY
ATTORNEY March 15, 1966  J. W. HICKS, JR  3,240,987
METAL AND GLASS FIBER STRUCTURES AND ELECTRICAL
DEVICES USING SAME
Filed Aug. 28, 1961  8 Sheets-Sheet 6
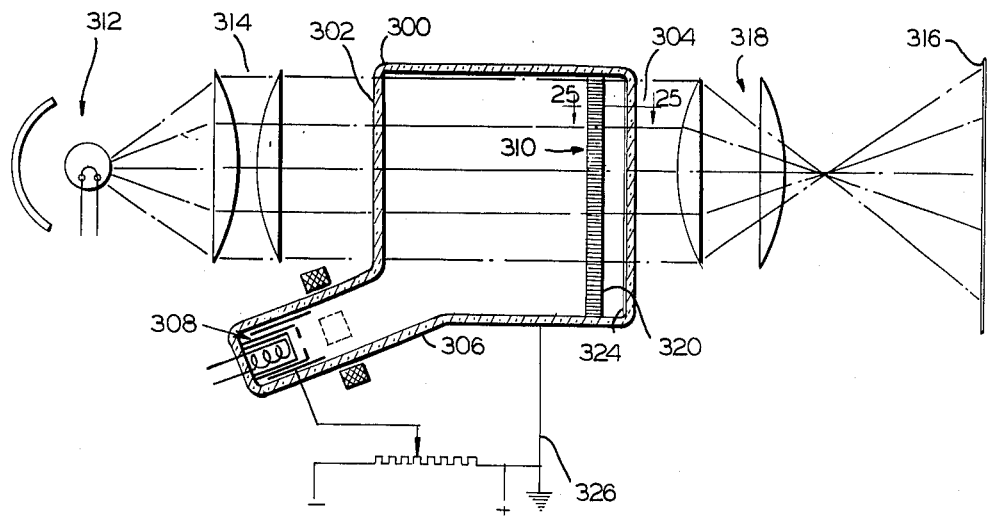
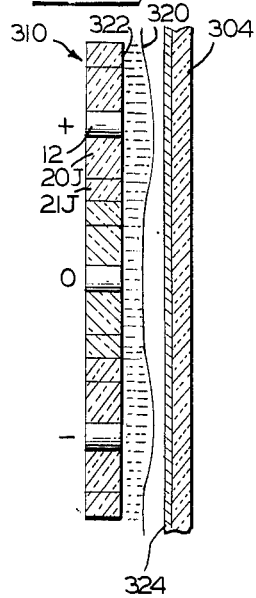 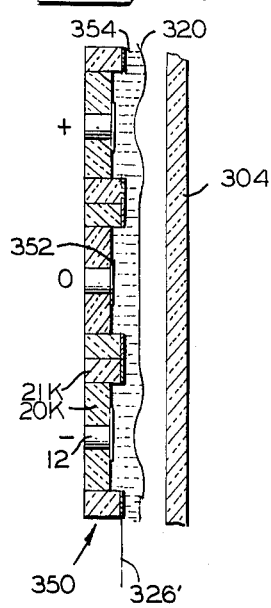 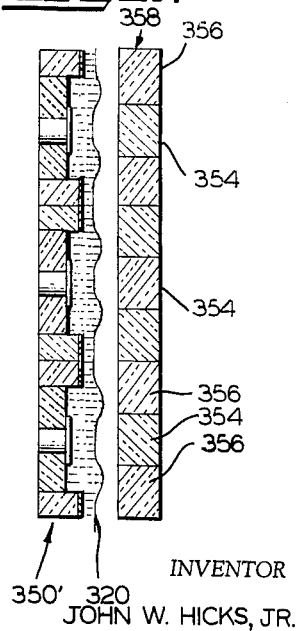
INVENTOR
JOHN W. HICKS, JR.
BY *Stowell & Stowell*
ATTORNEY

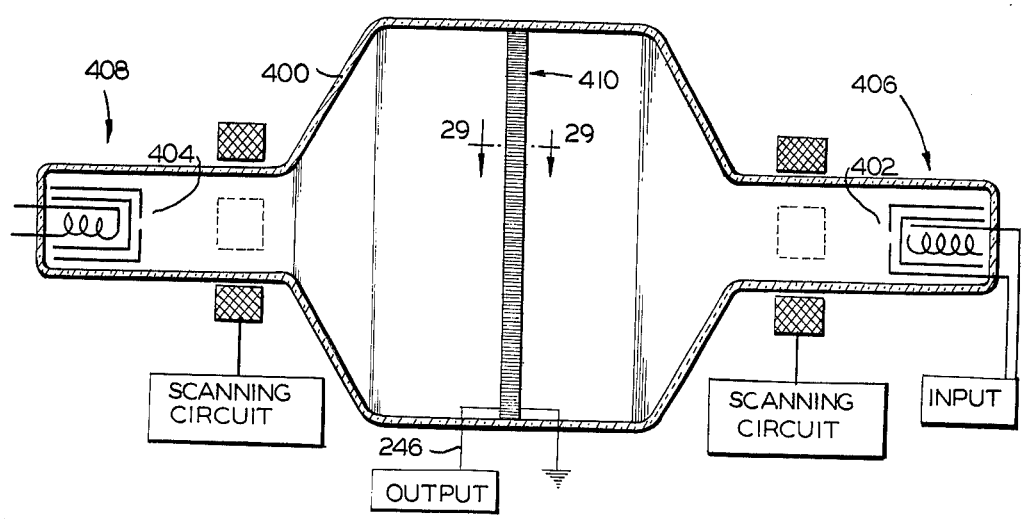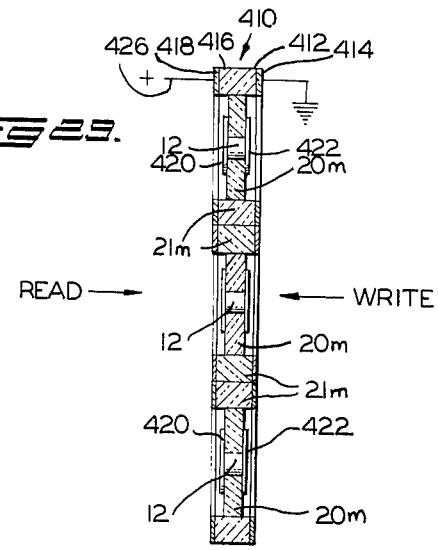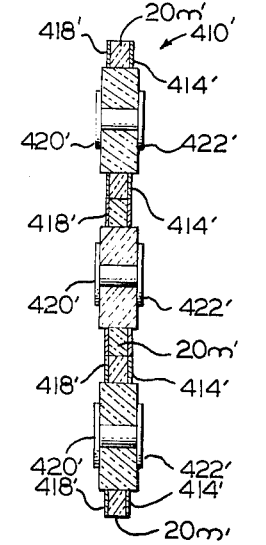

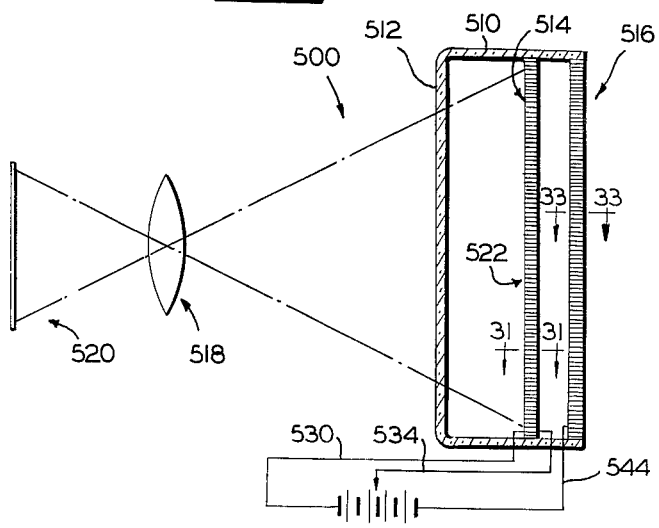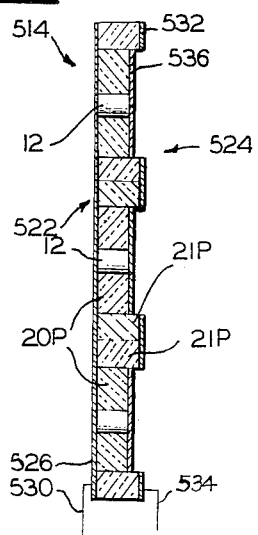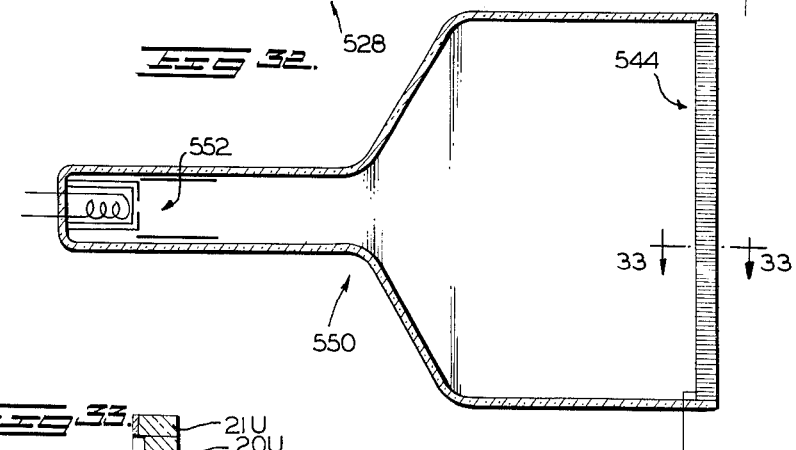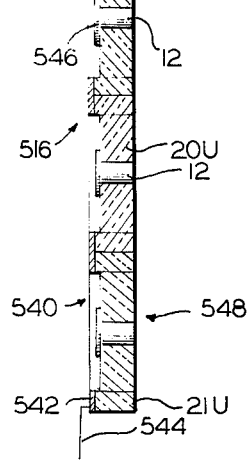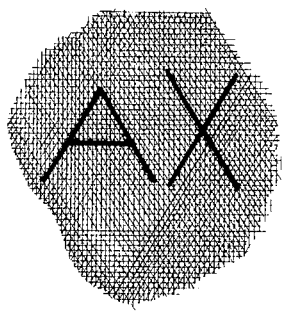

United States Patent Office 3,240,987
Patented Mar. 15, 1966

3,240,987
METAL AND GLASS FIBER STRUCTURES AND ELECTRICAL DEVICES USING SAME
John W. Hicks, Jr., Fiskdale, Mass., assignor to Mosaic Fabrications, Inc., Southbridge, Mass., a corporation of Massachusetts
Filed Aug. 28, 1961, Ser. No. 134,342
28 Claims. (Cl. 315—8.6)

This invention relates to improved metal and glass fiber structures, electrical and/or optical devices employing such structures, and improved methods of making such structures.

It is an object of the present invention to provide an improved wire and glass fiber mosaic assembly wherein each of the wires of each mosaic element of the mosaic assembly is positioned within a glass member provided with a glass sleeve and said glass member and glass sleeve have different resistances to etching.

A further object is to provide a metal-glass mosaic assembly wherein each of the mosaic elements of the assembly has at least one end shaped and electrically and/or optically modified to alter the electrical and/or optical characteristics thereof.

A further object is to provide an improved metal cored glass fiber mosaic assembly wherein portions of each mosaic element are electrically and/or optically interconnected while other portions of each of the mosaic elements of the mosaic assembly are electrically and/or optically independent of each of the other mosaic elements of the mosaic assembly.

These and other objects and advantages of the present invention are in part provided by a metal and glass fiber mosaic assembly comprising a plurality of wire embedded glass elements, the outer surfaces of the glass elements being fused into a homogeneous continuous matrix with the longitudinal axis of each of the wires lying generally in parallel wherein each of the mosaic elements includes at least a wire member and a pair of glass members having different resistances to etching.

Other objects and advantages of the present invention will be apparent to those skilled in the art from the following detailed description of the improved metal cored glass fiber structures, and assemblies thereof particularly described with reference to the accompanying drawings wherein:

FIG. 1 is a diagrammatic perspective view of a metal mosaic assembly having a glass jacket and a wafer shown sliced therefrom;

FIG. 2 is an enlarged perspective view of several mosaic elements of the mosaic assembly shown in FIG. 1;

FIG. 3 is an enlarged perspective view of one mosaic element consisting of a wire core, and a pair of concentric glass sleeves having different resistances to etching;

FIG. 4 is a section substantially on line 4—4 of FIG. 3;

FIG. 5 is a sectional view similar to that shown in FIG. 4 of a single mosaic element following a differential etch of the components thereof;

FIG. 6 is a perspective view of a modified form of a mosaic element consisting of a metal core surrounded by three glass sleeves having different resistance to etching;

FIG. 7 is a section substantially on line 7—7 of FIG. 6 following a differential etch of the mosaic element;

FIG. 8 is a perspective view of a modified mosaic element of the invention consisting of a metal core and three glass sleeves therefor with the glass sleeves having different resistances to etching;

FIG. 9 is a section substantially on line 9—9 of the mosaic element shown in FIG. 8 following a differential etch;

FIG. 10 is an enlarged view of the structure shown in FIG. 9 more clearly illustrating the features of the mosaic element;

FIG. 11 is a perspective view of a further form of a mosaic element including a wire core and three glass sleeves having different resistances to etching;

FIG. 12 is a section substantially on line 12—12 of FIG. 11 following a differential etch;

FIG. 13 is an enlarged sectional view of the structure shown in FIG. 12;

FIG. 14 is a diagrammatic sectional view of an image orthicon tube embodying a mosaic assembly of the invention and an operating circuit therefor;

FIG. 15 is an enlarged sectional view of one of the mosaic elements of the mosaic assembly employed in the image orthicon tube shown in FIG. 14;

FIG. 16 is an enlarged sectional view similar to that shown in FIG. 15 of a modified form of mosaic element for the image orthicon tube illustrated in FIG. 14;

FIG. 17 is a diagrammatic sectional view of an image intensifier employing a mosaic assembly of the invention;

FIG. 18 is an enlarged fragmentary sectional view substantially on line 18—18 of FIG. 17;

FIG. 19 is an enlarged fragmentary sectional view similar to FIG. 18 of a modified form of mosaic for the image intensifier;

FIG. 20 is an enlarged fragmentary sectional view similar to FIG. 18 of a further form of a mosaic element for an improved image intensifier;

FIG. 21 is a diagrammatic sectional view of an improved electrostatic printing apparatus embodying the principles of the invention;

FIG. 22 is an enlarged perspective sectional view of a mosaic element of the mosaic assembly employed in the electrostatic printing apparatus shown in FIG. 21;

FIG. 23 is an enlarged perspective view of a mosaic element which may be employed in an electrostatic printing apparatus of the type shown in FIG. 21;

FIG. 23a is a sectional view substantially on line 23a—23a of the mosaic shown in FIG. 23;

FIG. 24 is a diagrammatic sectional view of an improved light modulating device employing a mosaic assembly of the invention;

FIG. 25 is an enlarged sectional view substantially on line 25—25 of FIG. 24;

FIG. 26 is an enlarged sectional view similar to that shown in FIG. 25 of a modified form of mosaic structure for use in the light modulating device shown in FIG. 24;

FIG. 27 is an enlarged fragmentary view similar to that shown in FIG. 25 of a composite mosaic structure for use in the light modulating device shown in FIG. 24;

FIG. 28 is a diagrammatic sectional view of a memory storage unit employing an improved mosaic assembly of the invention;

FIG. 29 is an enlarged fragmentary sectional view substantially on line 29—29 of FIG. 28;

FIG. 29A is an enlarged fragmentary sectional view of a modified form of mosaic assembly for the device shown in FIG. 28;

FIG. 30 is a diagrammatic sectional view of a reading aid for the blind employing an improved mosaic of the present invention;

FIG. 31 is a section substantially on line 31—31 of FIG. 30;

FIG. 32 is a diagrammatic sectional view of a modified form of reading aid structure for the blind;

FIG. 33 is a section substantially on line 33—33 of FIGS. 30 and 32; and

FIG. 34 is an enlarged diagrammatic plan view of the face of the mosaic shown in FIGS. 30 and 32.

In my co-pending application Serial No. 18,593 filed March 30, 1960, there is disclosed a metal cored glass fiber structure and a method of making such structure.

The structures disclosed in said co-pending application in general consist of a composite mosaic comprising a plurality of hollow cylindrical glass outer members, each having a metallic inner member solidified from the fluent state in contact with the interior surface of the glass outer members and the outer surfaces of the glass members being fused into a homogeneous continuous matrix with the longitudinal axis of the metal cores lying generally in parallel. The resulting metal and glass mosaic assembly has been found to be very useful, when sliced into relatively thin wafers, as an electrical image conducting member for cathode ray tubes and the like.

Such structures have inherent disadvantages in that either the metal-to-glass ratio has been low and, hence, the electrical efficiency was low or the metal-to-glass ratio was high resulting in excessive capacitative couplings between the wire elements and spreading of secondary electrons. The present invention reduces these inherent disadvantages in the prior device and provides a metal and glass mosaic assembly having wide applications in the electrical and/or optical fields.

Referring to FIGS. 1 and 2 of the application drawings, 10 generally designates a metal cored glass fibers assembly composed of a plurality of wires 12 surrounded by glass tubes generally designated 14 with the axis of the wires generally lying parallel and the outer surfaces of the glass tubes being fused to adjacent glass tubes to provide a homogeneous structure. The homogeneous assembly of mosaic elements 16 consisting of a plurality of metallic wires having glass jackets may be provided with a jacket or sleeve 18 of glass, metal or the like, the type of jacket selected depending on the use for which the electrical and/or optical mosaic assembly is intended.

As more clearly shown in the enlarged perspective view in FIG. 2 of several mosaic elements of the mosaic assembly shown in FIG. 1, the glass jackets 14 are illustrated as having a generally hexagonal shape in section normal to the longitudinal axis of the wire cores. The hexagonal shape results from close packing of the plurality of mosaic elements during fusing of the outer surfaces thereof and/or drawing of a plurality of stacked metal cored glass fiber elements, as will be more fully discussed hereinafter.

When a wafer cut from a metal cored glass fiber assembly is employed as, for example, a face plate for a cathode ray tube or the like, a certain number of secondary electrons will be emitted from a wire when a primary electron strikes a wire. If the ratio of secondary electrons emitted from the wire to the primary electrons striking the wire is less than one, a net negative charge would remain on the wire, whereas if the ratio of secondary to primary electrons is greater than one, a net positive charge remains on the wire. If $r$ is the ratio, then $r$ minus 1 would represent a charge amplification factor and for highest electrical efficiency, $r$ minus 1 should be as large as possible.

It is known that such secondary electrons are emitted with a distribution or spread in energy averaging about two electron volts in magnitude. This average energy level is remarkably independent of the energy of the primary electron. Further, the secondary electrons are emitted in substantially all directions and their ultimate point of rest depends in part on their initial energy and direction and on the electric field in the vicinity of the electrons.

It has been found that by topically modifying, for example, by differential etching or abrasion, the contour of one or both ends of a wafer sliced from a metal and glass mosaic assembly and by modifying the electrical and/or optical properties of the topically modified end surfaces of the wafer, it is possible to obtain a high ratio of area of metal to total area while retaining low capacitive coupling and also to control secondary electron emission of the mosaic assembly thereby substantially improving the electrical and/or optical properties of devices employing such metal cored glass fiber wafers and opening up new fields of use therefor.

In general, control of the topography of the ends of the mosaic assembly is obtained by constructing each mosaic element from at least a wire core and a pair of concentric glass sleeves having different resistances to etching and, following assembly of a number of mosaic elements into a mosaic assembly, differentially etching the glass sleeves and coating or plating selected portions of the differentially etched mosaic assembly with materials having the desired electrical and/or optical properties.

FIG. 3 of the drawings is a greatly enlarged perspective view of one mosaic element consisting of a wire core 12 and a pair of concentric glass sleeves 20 and 21 having different resistances to etching and FIG. 4 is a section through the mosaic element shown in FIG. 3. Where the mosaic element is to be used as a face plate for a cathode ray tube, as many as one million metal cored glass fiber structures of the type shown in FIG. 3 per square inch may be included in the mosaic assembly, the diameter of each of the metal cores 12 being, for example, about .0004 inch. The number of mosaic elements per square inch of the mosaic assembly and the diameter of the metal cores thereof is illustrative only and the number and diameter thereof may be widely varied, depending upon the particular uses for which the mosaic assembly is fabricated.

The metal cores 12 may be formed of substantially any metal composition that will bond to glass if the wire is formed first and then clad with the concentric glass sleeves. For example, aluminum, nickel, tugsten or iron wire will provide satisfactory results and the selection of the metal would depend to a large extent on the ultimate use of the mosaic assembly. For example, where the electrode is to have good secondary electrode emission, a metal such as nickel may be plated on the wire electrodes and where low secondary emission is desired, a metal such as gold may be employed as the core for mosaic elements.

Where the wire is formed in the glass tubes from the liquid state as disclosed in my co-pending application Serial No 18,593, a copper-silver alloy has been found to provide very satisfactory mosaic elements. The following compositions have been found to be very satisfactory:

(A) Silver 50%; copper 15.5%; zinc 16.5%; cadmium 18%

(B) Silver 15%; copper 80%; phosphorus 5%.

In order to topically modify the contour of the ends of the mosaic assembly glasses 20 and 21 may have different etching or abrasion characteristics. Further, where light is to be channelled through the mosaic assembly, the light transmitting path would comprise concentric glass tube 20 which should have a high index of refraction while the outer glass sleeve 21 should have a lower index of refraction, as is generally known in the fiber optics art. Generally, the light transmitting member 20 for optimum optical properties should be insulated from the wire core 12 by a glass having a lower index of refraction than the light transmitting channel formed by glass sleeve 20 as to be more fully described hereinafter.

Lead oxide or lanthanum oxide glasses are very etchable and provide glasses having high indices of refraction. Pure silica glass has a very low index of refraction and the following additives increase the index of refraction in the order listed: lithium oxide, sodium oxide, potassium oxide, calcium oxide, lead oxide, and lanthanum oxide.

As hereinbefore discussed, through the proper selection of a glass composition, a glass mosaic element having differential etching characteristics may be readily constructed. In general, high lead content silicate glasses or high borax, high alkali glasses, will etch more rapidly with acids such as hydrochloric or nitric or mixtures thereof than the high silica glasses. As a general rule, starting with any common silicate glass composition, by the addition of an alkali, borax, or lead, the etchability in all acids of the resulting glass increases. A glass suitable for the inner glass sleeve 20 may comprise: $SiO_2$—35% by weight; PbO—85% by weight; $K_2O$—7% by weight.

A glass highly resistant to etching and suitable for the outer concentric glass sleeve 21 may comprise: $SiO_2$—81% by weight; $Na_2O$—3.5% by weight; $K_2O$—.4% by weight; $B_2O_3$—12.9% by weight; and $Al_2O_3$—2.2% by weight.

A glass composition having an etching rate intermediate the above mentioned glass compositions comprises: $SiO_2$—73.6% by weight; $K_2O$—.6% by weight; $Na_2O$—16% by weight; CaO—5.2% by weight; MgO—3.6% by weight; $Al_2O_3$—1% by weight. This glass also has the important property that it will not slag with conventional metal fibers employed in the construction of suitable metal cored mosaic elements.

It will be particularly noted that the glass listed above which is highly etchable has a high index of refraction while the glasses having the intermediate and high resistances to etching have lower indices of refraction thus permitting topical modification of the mosaic elements of the assembly without reducing the light transmitting properties of the wire cored mosaic assembly.

Various methods may be employed in the manufacture of the very fine metal cored glass fiber elements and the composite mosaic assembly. As hereinbefore set forth, the metal cores may be formed in concentric glass tubes from a melt of both the glass and the metal stock, as disclosed in application Serial No. 18,593, or concentric glass tubes with a preformed wire may be drawn. Where the composite mosaic element is formed as disclosed above, the wire cores do not materially change in diameter during drawing and the size of the wire for the core is selected prior to the drawing operation. Following the initial formation of each element consisting of a wire core and at least a pair of concentric glass tubes, the resulting element may then be cut into suitable lengths stacks like cord wood, reheated and pressed through a suitable die to fuse and press the outer surface of each of the concentric glass tubes of each of the mosaic elements to adjacent glass tubes to provide a homogeneous structure. During the pressing operation, the individual mosaic elements generally assume a hexagonal shape in cross section which results from the close packing of the cylindrical elements. The composite homogeneous structure may then be reheated and redrawn to further reduce the diameter of the resulting mosaic assembly and each of the concentric glass sleeves of each of the elements thereof.

Another method of forming the mosaic assembly is to form each element from a melt, cut the formed elements into suitable lengths and place them within a large highly etchable glass tube. By reheating and drawing the elements and the glass tube progressively through heated reducing dies, the diameter of the individual elements and the resulting diameter of the mosaic assembly is suitably reduced. This drawing operation reduces the diameter of the wire cores in proportion to the reduction in the diameter of the assembly. When the mosaic assembly reaches the desired diameter, the outer glass tube of highly etchable glass may then be removed by etching.

Another method of making the mosaic assemblies is to form each of the mosaic elements from a melt, group a plurality of such elements and re-draw the elements until a suitable diameter is achieved. The groups of re-drawn elements are then cut and stacked like cord wood, placed in a heated die under pressure to fuse the groups of elements into a large homogeneous metal cored glass fiber assembly.

The composite mosaic assembly of wire cored glass fibers may have a finished diameter of, for example, 6 to 10 or more inches, the finished diameter being determined by the dimensions of the device in which the mosaic assembly is to be used. The mosaic assembly is then sliced into a plurality of relatively thin wafers as illustrated in FIG. 1. These wafers are ground and polished, using conventional glass grinding and polishing techniques. The wafers are then ready for use or finishing to provide the improved electrical and/or optical properties.

Referring to FIG. 5 of the drawings, the mosaic element illustrated in FIGS. 3 and 4 is shown following etching of the wire core 12 and the first concentric glass tube 20 to provide a glass web 21 about each glass sleeve 20 and wire 12 as illustrated in FIG. 2. Following the grinding and polishing to the desired thickness, the face opposite the face to be processed is coated with a protective layer of material such as polyethylene wax. The wafer is then dipped in concentrated nitric and hydrochloric acid, for example, a 50–50 mixture, for about 5 minutes, then rinsed and dipped in a 5% hydrofluoric acid bath for about 1 minute, then rinsed. This procedure is repeated until the proper depth of etch is achieved. The nitric acid-hydrochloric acid mixture attacks the glass 20 but does not attack the glass 21. While attacking the glass 20 the acid leaves a residue of silica particles in the etched openings which, as the openings become deeper, are increasingly hard to rinse out. The hydrofluoric acid dip removes this debris. However, the hydrofluoric acid also attacks the outer glass sleeve 21 and, therefore, the hydrofluoric acid dipping is kept to a minimum.

When the acid etch comprises nitric acid and hydrochloric acid, the metal cores 12 are also etched as the inner glass sleeves etch. Where the inner glass sleeves are etched by an acid which would not also etch the thin metal cores as the glass sleeves are etched, the upstanding ends of the metal cores are thereafter removed by etching with a suitable acid.

Another satisfactory etching bath may comprise 25% nitric acid, 25% hydrochloric acid and 50% water by weight. The wafer is placed in this bath for approximately 15 minutes, rinsed in water, then etched for 1 minute in hydrofluoric acid, then rinsed in a dilute sodium hydroxide solution. If this cycle is repeated, for example, 10 times, it has been found that fibers having a diameter of about .004 inch will have etched to a depth of about .004 inch. Where a deeper etch is desired, it has been found to be advisable to etch the wafers in an ultrasonic bath where the high frequency vibrations assist in directing the etchant into the etched openings and the ultrasonic bath also aids in removing the silica debris left by the etchant.

Where both faces of the wafer are to be topically modified, both faces may be etched at the same time or at different times through the use of a suitable coating, such as a polyethylene wax, and it will also be appreciated that one face of the wafer may be etched deeper than the opposite face.

Referring to FIGS. 6 and 7, there is illustrated a modified mosaic element comprising a metal core 12, a first concentric glass sleeve 21a, a second concentric glass sleeve 20a, and a third concentric glass sleeve 21a'. Glass sleeves 21a and 21a' correspond to the outer glass sleeve 21 of FIGS. 3, 4 and 5, and are composed of a glass highly resistant to etching while glass sleeve 20a corresponds to glass sleeve 20 of FIGS. 3, 4 and 5 and is composed of a glass that is highly etchable.

The mosaic element shown in FIGS. 6 and 7 is formed as described with reference to FIGS. 3 through 5 and the elements are formed into a mosaic assembly, sliced into wafers which are then ground and polished the resulting wafer etched on one face to provide a structure as illustrated in FIG. 7 wherein the outer glass sleeves 21a, the innermost glass sleeves 21a', and the metal cores 12 are substantially at their ground and polished thickness while glass sleeve 20a have been etched on one face to the desired depth.

Referring to FIGS. 8, 9 and 10, there is shown a glass cored mosaic element having three concentric glass sleeves with each of the glass sleeves having different properties. The metal core 12 is the same as metal core 12 of FIGS. 3 through 5, the outer glass sleeve 21b may be the same composition as glass sleeve 21 of FIGS. 3 through 5 and is highly resistant to etching; glass sleeve 20b may be the same composition as glass sleeve 20 of the mosaic element shown in FIGS. 3 and 5 and is, therefore, highly etchable while the thin walled sleeve 24 surrounding the wire core 12 is selected to have substantially the same etching rate as glass 20b; however, the glass sleeve 24 is selected to have non-slagging properties with the metal core 12. It will also be appreciated that the thin walled glass sleeve 24 may be selected to have a lower index of refraction than glass sleeve 20b to improve the image or light transmitting properties of glass sleeve 20b. A suitable non-slagging glass for use in constructing the glass sleeve 24 of the mosaic element illustrated in FIGS. 8 through 10 may consist of 70% by weight $SiO_2$; .1% by weight of CaO; .2% by weight $K_2O$; 28% by weight of $B_2O_3$; .2% by weight of MgO; 1.1% by weight of $Al_2O_3$; and 1.2% by weight of $Li_2O$.

This glass also has a lower index of refraction than glass 20b.

After forming the mosaic element illustrated in FIGS. 8 through 10 by a process as described with reference to FIGS. 3 through 5, a composite mosaic assembly is formed, sliced into wafers, ground, polished and etched so that the metal core 12, its immediate glass sleeve 24 and glass sleeve 20b are etched to a depth lower than the glass sleeve 21b thereby forming a web interconnecting all of the mosaic elements of the assembly.

Referring to FIGS. 11 and 12, there is shown a further form of a mosaic element including a wire core 12 and three glass sleeves having different resistances to etching and/or degrees of oxidation of metals designated from the core outwardly, 23, 20c and 21c. Glasses 20c and 21c correspond to glasses 20 and 21 illustrated and described with reference to FIGS. 3, 4 and 5 while glass 23 which surrounds the metal core 12 has an intermediate rate of etching and has the important property that it does not slag with the metal fiber.

This glass may have a composition consisting of 73.6% by weight of $SiO_2$; .6% by weight of $K_2O$; 16% by weight of $Na_2O$; 5.2% by weight of CaO; 3.6% by weight of MgO; and 1% by weight of $Al_2O_3$.

Following the formation of the mosaic elements and fusing the plural elements into a mosaic assembly with or without subsequent drawing of the composite assembly as hereinbefore described, a wafer is cut from the assembly, ground, polished and then etched. Since glass sleeves 21c, 20c and 23 each have a different rate of etching, the resulting structure consists of an outer glass ring having the greatest thickness, an inner glass ring 23 about the metal core 12 which is etched to a depth E and a glass sleeve 20c, between glass sleeve 23 and 21c, which etches to a depth indicated as F greater than the depth E.

Referring specifically to FIGS. 13, in order to further modify the electrical characteristics of the device of the invention, the surfaces 28 of each of the elements 21c of the mosaic assembly may be coated with a metal to provide an electrically conductive path interconnecting each of the mosaic elements of the assembly. In FIG. 2 of the drawings, the form of such a metallic web is clearly shown and the metallic web is illustrated at 30 in FIG. 13. Also to improve the electrical characteristics of the assembly, a metallic cap 32 is placed on the face 33 of glass sleeve 23. The metal wire 12 serves to carry an electrical current from one face of the wafer to the opposite face and the metal cap 32 which is placed over the glass sleeve 23 and the wire 12 effectively increases the electrical efficiency of the mosaic and in a manner funnels electrical charges received thereon to the wire 12.

The metal grid 30 placed on the faces 28 of glass sleeves 21c provides a continuous honeycomb-like electrode uniformly spaced from each of the wires 12 and caps 32. If the metal grid 30 is maintained by suitable connection to a source of electric current at a voltage level such that $r-1$ is positive, the grid will attract secondary electrons and capture them. The low energy secondary electrons will not knock out tertiary electrons from the grid. Thus, the capturing of the secondary electrons prevents spurious charges on neighboring electrodes. If, however, $r-1$ is to be negative, the metallic grid 30 is maintained at a voltage level which will repel secondary electrons and drive them back onto the wire 12 and its metallic cap 32.

It will be apparent to those skilled in the art that due to the small diameter of the metal wire 12, the interwire capacitance will be small. It will also be apparent that there is a disproportionate capacitance between the metal caps 32 of the assembly; however, this capacitance is substantially less than would exist between the wires having a diameter equal to the diameter to the metal caps 32. Moreover, if dimensions E and F are nearly equal so that the cap and the grid are more or less coplanar, then the grid further reduces interelectrode capacitance and the cap-to-cap capacitance can be made negligibly small.

It is further pointed out that the glass matrix 23 supporting the wire 12 has a dielectric constant of from about 5 to about 10 and by etching the sleeves as shown in FIG. 13, the cap-to-grid or cap-to-cap capacitance is still further reduced. In constructing devices utilizing the improved optical/electrical mosaic, the relative value of F and E is selected to obtain the best compromise between suppressing or capturing secondary electrons and reducing the capacitance of the assembly.

It is further pointed out that by decreasing the diameter of the wires 12, the entire mosaic assembly is strengthened mechanically since the glass-to-metal bond is relatively poor compared to a glass-to-glass bond. It is, therefore, advantageous to reduce the area of the metal-to-glass bond. In the practice of the present invention due to the extremely small diameter of the wires, the mosaic assembly can be made almost as strong as solid glass; hence permitting the use of thin wafers which results in further reducing the capacitance of the assembly. Another advantage of employing a metal cap 32 on the wire 12 is that the composition of the cap may differ from the composition of the wire metal. For example, the wire metal may comprise a metal that is a poor secondary electron emitter and when a high secondary electron emission is desired, the cap can be chosen to comprise a material having good secondary electron emitting properties. As will be more fully described hereinafter, the cap may comprise a material having photocathodic properties. Further, the opposite face of the mosaic assembly may be coated with metal or an electrically conductive and optically transparent material 36 such as Nesa, consisting essentially of tin oxide. The layer 36, the metallic grid 30 and the cap 32 may be variously applied to the etched mosaic assembly. If the distance E is zero whereby the surface 28 is in substantially the same plane as the surface 34, a metallic paint, consisting of a metal suspended in a suitable organic binder, which may include oxides and fluxes, may be rolled or stamped onto the mosaic assembly. The coated assembly is subsequently heated to burn out the organic carriers and improve the adhesion of the coating to the glass. Alternatively, a metal may be evaporated onto the surfaces 28 and/or 33. Where evaporative metallic coating processes are employed, a slight amount of the metal may form on the sides of the etched contour of the mosaic assembly which is subsequently removed by a light acid etch.

From the foregoing description of FIGS. 1 through 13, it will be seen that the present invention provides new and improved metal cored glass fiber structures and devices wherein the metal core is surrounded by at least a pair of concentric glass sleeves having different resistances to etching or abrading whereby wafers, sliced from a homogeneous group of such structures and assembled into a mosaic assembly, may be topically modified on one or both faces of the wafers to provide useful metal-glass mosaic devices or assemblies which may be further modified as to be more fully described hereinafter to improve the electrical and/or optical properties thereof.

*Image transducer embodying a metal cored glass fiber assembly*

Referring to FIG. 14, there is illustrated a cathode ray tube 40 which includes a conventional electron gun assembly 42 and scanning circuit coils 44. The face 46 of the cathode ray tube is generally flat and in the illustrated form of the invention is light transmitting and uncoated. Between the inner surface of face 46 of the cathode ray tube and the electron gun 42 is mounted an optical-electrical mosaic assembly generally designated 48. A mosaic element of the mosaic assembly 48 is illustrated in FIG. 15 and comprises a metal wire 12, a first concentric glass sleeve 20d and a second concentric glass sleeve 21d. The metal core and the pair of glass sleeves are of the type illustrated in FIG. 5 and the metal core 12 and the glass sleeve 20d have been etched below the face of the glass sleeve 21d and a homogeneous assembly of these units is mounted in the image orthicon tube 40 so that the unetched end of the wafer is parallel with the inner surface of the face 46 of the tube while the opposite end of the wafer is directed toward the electron emitting gun 42.

The inner or gunward surface of the mosaic element illustrated in FIG. 15 is provided with an electrical conductive metallic coating 50 which may be applied as previously described with reference to FIG. 13 of the drawings. The outer surface 52 of the wafer is provided with an electrically conductive light transmitting coating 54 which may be identical to coating 36 illustrated in FIG. 13. The etched surface of wire 12 and the etched surface of glass sleeve 20d are suitably coated with a photocathodic material 56 of any of the conventionally known types. The metallic honeycomb grid 50 is connected by an electrical conductor 58 of FIG. 14 through a resistance 59 to a source of electric current 60. This grid is also connected through a condenser 62 to the control grid of a conventional electronic valve 64. The coating 54 of the mosaic assembly is also connected to the source of electric current 60 through a conductor 66. With this arrangement, light from a suitable object passing through the face plate 46 of the orthicon tube 40 passes through the coating 54 and is transmitted through the glass 20d to the photocathode 56 modifying its electrical characteristics. Primary electrons from the scanning gun 42 on striking the photocathodes 56 of the plurality of mosaic elements cause them to give off secondary electrons, the number of which depends in part upon the amount of light passing through the glass elements 20d of each particular element. The secondary electrons emitted by the said photocathodes are collected by the metallic web 50 and amplified by the amplifier 64. Signals amplified in the amplifier 64 are utilized to modulate a carrier wave generated in the oscillator 68 which signals are superimposed upon a carrier wave with the aid of the modulator 70 and is transmitted in known manners.

From the foregoing discussion of FIGS. 14 and 15, it will be appreciated that the optical image formed on the photocathodes and the number of electrons released therefrom by the primary electrons from the electron gun 42 may be substantially increased by including within the system a good secondary electron emitter coupled with the metallic grid and the photocathodes.

Such an improved structure is illustrated in FIG. 16 where each of the mosaic elements of the mosaic assembly consists of a glass rod 23e, a first glass sleeve 24e having a wire 12 positioned therein and a third glass sleeve 21e. The relative resistances to etching of these glasses is in the order illustrated and described with reference to FIG. 13. The outer unetched surface 80 of the mosaic assembly is coated with a suitable electrically conductive and light transmitting coating 54e, the etched inner surface of the glass sleeve 24e and wire 12 are coated with a photocathode material, the etched surface of glass rod 23e is coated with a metal having good secondary electron emission properties while the surfaces 84 of sleeves 21e are provided with a metallic coating 50e which forms the grid web.

With this form of construction, it will be apparent that the cooperation between the photocathode 56e and the good electron emitter 32e will produce a greater number of electrons which will travel to the web 50e upon being energized by the light source. This will drive the cap 32e positive faster than the cap 56 of the form of the invention shown in FIG. 15.

Referring to FIGS. 17 and 18, there is shown an image intensifier employing an improved mosaic assembly of the invention. The image intensifier includes a tube 90 having a flat rear face 92 and a flat front face 94. Within the tube and between the faces 92 and 94 is mounted an improved electrical-optical mosaic generally designated 96. The assembly also includes a conventional aluminum backed phosphor coating 98 provided on the inner surface of the tube face 94. In addition, the image intensifier includes a source of electric current 100 and conductors 102, 104 and 106 interconnecting the opposite faces of the mosaic assembly 96 and the aluminum backed phosphor 98 to provide voltage gradients therebetween.

An enlarged fragmentary sectional view of the device shown in FIG. 17 is illustrated in FIG. 18. Each of the mosaic elements of the mosaic assembly is identical in form to the mosaic element illustrated in FIG. 15 and includes a wire 12, first glass sleeve 20f and second glass sleeve 21f.

The unetched face of the mosaic assembly is coated with an electrical conductive light transmitting coating 54f, the etched surfaces of the wire 12 and of the glass sleeve 20f are provided with a coating of a photocathode material 56f and the web formed by the sleeves 21f is provided with an electrically conductive metallic coating 50f.

As illustrated in FIG. 18, if the diameter G of the photocathode 56f is .001 inch, then the distance between the metallic web 50f and the aluminum backed phosphor 98 is about $\frac{1}{20}$ of an inch or 50G. A suitable range of diameters for the photocathode material 56f is from about .001 to about .01 inch.

In operation of the device, an image of an object 110 is projected on the coating 54f of the assembly by a lens 112. The optical image passes through the light transparent electrically conductive coating 54f and energizes the photocathode which produces electrons in proportion to the light intensity at each point of the image. These electrons are accelerated by the electrostatic field created by the source of current 100 connected to the aluminum backed phosphor 98 and to the grid 50f and the electrically conductive light transmitting coating 54f. The electrons emitted from the photocathode are focussed by the electrically conductive web 50f by maintaining the electric charge on the webbing 50f from about 1 to 10 volts negative compared to the voltage of the wire 12. The potential difference between the grid and the wire 12 depends on the depth of the etch and the strength of the uniform accelerating field between the metallic web 50f and the phosphor 98. For instance, if the etch in each of the mosaic elements is .005 inch deep and .010 inch wide and the uniform oscillating field is 10,000 volts per inch, then the bias may be 10 volts or more.

FIG. 19 of the drawings is an enlarged fragmentary sectional view similar to FIG. 18 of a modified form of structure for the image intensifier wherein each of the mosaic elements of the mosaic assembly is identical to those illustrated in FIGS. 17 and 18. However, interposed between the aluminum backed phosphor 98 on the inner surface of the tube face 94 and the metallic webbing of the mosaic assembly 96a is a metallic grid 114 having openings 116 therein aligned with each of the photocathodes of the mosaic assembly 96a. The spacing H between the metallic webbing of the mosaic assembly and the near surface of the metallic grid 114 is preferably about equal to the diameter G of the photocathode element of each of the mosaic elements of the mosaic assembly 96a. The grid 114 is provided to capture emitted electrons which are not properly focussed by the grid on the mosaic assembly while the properly focussed electrons pass through the corresponding openings 116 in the grid 114. The capture of the unfocussed electrons is enhanced by maintaining a potential bias on the grid 114.

More accurate channeling of the emitted electrons is provided by passing the electrons through a tube to the anode or aluminum backed phosphor 98 on the face 94. An improved channeling method for directing the emitted electrons to the phosphor 98 is illustrated in FIG. 20 wherein a glass tube 120 extends between the inner surface of the aluminum backed phosphor 98 and the metallic webbing on the mosaic assembly 96b which may be identical in form to that illustrated and described with reference to FIG. 18 of the drawings. In the illustrated form of the invention, the inside diameter of the glass tube 120 is about the same as diameter G of the photocathode of each of the mosaic elements, while the length of the glass tubes 120 is about 50 times the dimension G.

In order to make the glass tube structure for the emitted electrons from the photocathode, the glass tube 120 is formed of a glass which is highly resistant to etching while the space between the inner surface of the glass tube 120 comprises a highly etchable glass.

A wafer sliced from such a mosaic assembly is etched from both ends and the etching procedure is continued until all of the highly etchable glass is removed from the assembly leaving a plurality of tubes interconnected through their outside surfaces. The mosaic assembly of these tubes is aligned with mosaic assembly 96b.

In the image intensifier described with reference to FIGS. 17, 18, 19 and 20, the relatively simple mosaic assembly illustrated in FIG. 15 has been described. It will be evident to those skilled in the art that further improvements in image intensification and sharpness of the resulting image would be provided by employing a mosaic assembly constructed as shown and described with reference to FIG. 16 as the metal cored glass fiber elements of the mosaic assembly.

*Electrostatic printing device employing an improved metal cored glass fiber assembly*

Referring to FIGS. 21 and 22, there is diagrammatically illustrated an improved electrostatic printing apparatus employing the principles of the present invention. The electrostatic printing device includes a cathode ray tube 200 provided with a conventional electron gun 202 positioned at one end of the cathode ray tube envelope 206. At the opposite end of the cathode ray tube envelope is mounted a conductive plate 208. Both sides of the conductive plate 208 are maintained at ambient pressure. Interposed in spaced relationship between the conductive plate 208 and the electron gun 202 is an improved wire cored glass fiber structure 210, one mosaic element of which is more clearly illustrated in FIG. 22.

The mosaic assembly 210 is constructed as disclosed in FIGS. 3, 4 and 5 of the application and includes a fine wire core 12, a first glass sleeve 20h and a second glass sleeve 21h. As described with reference to FIGS. 3 through 5, the glass sleeve 20h is constructed of glass that is readily etchable with respect to glass sleeve 21h whereby to provide a honeycombed webbing surrounding the plurality of glass sleeves 20h and the fine wires 12. The glass webbing is coated with a conductive metal 30h and each of the wires 12 and its surrounding glass sleeve 20h is also coated with a conductive metal layer generally designated 212. The conductive metal layer 212 is preferably a relatively poor secondary electron emitter. The assembly also includes a roll of dielectric writing medium 214 such as paper, and a takeup roll for the dielectric writing medium. The takeup roll and/or the supply roll for the dielectric writing medium are driven to advance the writing medium between the face of the mosaic structure 210 and the inner face of the conductive plate 208 through openings 218 and 220 at a rate which is determined by the rate of scanning of the original document. As is well known in the art, the scanners for the document being copied may be employed to control the movement of the dielectric writing medium through the electrostatic printing device.

Between the takeup roll 216 and the cathode ray tube envelope 206 is positioned a conventional electrostatic developing and printing apparatus generally designated 222. A source of operating potential 224 is provided for the cathode ray tube 200, the most negative voltage being applied to the cathode and the positive voltage being connected to ground. The metallic web 30h of the mosaic assembly is maintained through a resistive path including, for example, resistor 226 at a more negative potential than the conductive backing plate 208 which is connected to ground and to the source of potential through ground lead 230 and resistor 232, respectively. With this arrangement, the webbing 30h may stabilize at 50 to 100 volts negative relative to the backing plate while the wire electrodes 12 float at a potential of, for example, 40 to 80 volts positive to the webbing 30h. This would set the fine wires 12 at a potential so that the webbing 30h would pick up all secondary electrons emitted from the layer 212.

With the arrangement shown in FIGS. 21 and 22, the very fine wire electrodes 12 of about .004 inch in diameter corona very readily the to the intense field surrounding the wires. In operation of the device the cathode ray tube is controlled by indicia on an original document which may be viewed by a suitable mechanical or television type scanning device. The output signals from the scanning device represent the information on the document to be printed which signals are supplied to the control grid of the cathode ray tube 200. Since each of the plurality of wire cores 12 is isolated from ground and from each other, any wire upon which the cathode ray beam falls begins to charge toward the cathode potential. When the potential of the wires reaches a critical value with respect to the ground, a discharge takes place beween the wires 12 and the conductive backing plate 208 producing a spot charge on the dielectric writing medium and after the dielectric writing medium passes through the electrostatic developing and fixing apparatus 25, the indicia on the document to be copied is reproduced on the dielectric writing medium.

In FIGS. 23 and 23a, a system of wire cored glass fiber mosaic structures is shown which would provide substantial amplification. Referring to these drawings, there is shown a mosaic assembly 240 positioned to receive the electrons from the cathode ray gun 202 of the cathode ray tube 200 shown in FIG. 21.

The mosaic assembly 240 includes the wire core 12, a first glass sleeve 242, a second glass sleeve 244, and a third and outer glass sleeve 246. The outer glass sleeve 246 has a further glass member 248 introduced in at least one area of a wall thereof. The relative etchability of the glasses 242, 244, 246 and 248 is such that glass 248 is the most resistant to etching, glass 244 is the most etchable and glass 242 is more readily etched than glass 246 comprising the greater portion of the outer glass sleeve of each of the mosaic elements of the mosaic assembly. The glass 248 may extend from face to face of the wafer forming the mosaic assembly whereby the glass sleeve 246 comprises two glass compositions.

Following the acid etching of a ground and polished wafer constructed from the four glass members and the wire core, the etched face of the mosaic 240 is contoured as illustrated in FIGS. 23 and 23a. The honeycombed web formed by the outer glass sleeve 246 of each of the mosaic elements including the projecting blip or boss formed by glass member 248 is provided with a layer of conductive metal 250 which is connected to a pulsing potential synchronized with the electron gun 202 of FIG. 21 via conductor 252. The potential of the pulsing current relative to the backing plate 208 and the wires 12 is adjusted such that corona discharge will not occur until a discharge occurs between wires 12 of the mosaic assembly 240 and the metallic webbing 250 which discharge occurs when the cathode ray beam from the gun 202 raises the potential of the wires 12 to a critical value with respect to the potential on the metallic web 250. As soon as a corona discharge occurs between the fine wire 12 of the mosaic element 240 and the web 250, a corresponding discharge takes place from the point 254 to the metallic backing plate 208 providing an electrostatic charge on the dielectric writing medium passing between the inner surface of the plate 208 and the outer face of mosaic assembly 240.

The electrical discharge to the dielectric writing medium continues for the duration of the pulse supplied to webbing 250 via conductor 252 connected to a suitable pulse circuit, thereby providing amplification in the printing circuit.

From the foregoing description of the improved electrostatic printing device, it will be apparent to those skilled in the art that various modifications may be made in the form of the mosaics without departing from the scope of the present invention. For example, it will be apparent that the outer face of the mosaic 210 may also be etched and provided with a metal electrode on the outer webbing formed by the etching process thereby providing a moderately high resistive coating between the outer ends of each of the wires 12 of the mosaic assembly 210 and the outer conductive webbing thereby stabilizing the wires 12 at a voltage almost equal to the voltage of the outer conductive webbing independent of the voltage of the electrode 208 forming the backing for the dielectric paper medium, permitting adjustment of the current necessary to corona discharge independent of adjustments necessary for secondary electron capture.

*Light controlling device*

Referring to FIGS. 24 through 27, there are shown devices for controlling the transmission or reflection of light in response to a rapidly varying control factor. An important application of the devices shown in FIGS. 24 through 27 is in connection with television reception where it is desired to produce images of greater intensity or brightness than can be obtained with ordinary previously available image reproducing means.

It is known that electrons from a cathode ray tube leave a charge pattern on an oil film. Where the oil film is smooth, light from an independent source is transmitted without decollimation; however, where ripples are formed in the film of oil, the light is scattered, passing through the oil film and an image may be formed from the scattered and collimated light on a screen.

Referring to FIG. 24, there is shown a tube 300 which includes a flat rear face 302 and a flat front face 304. The envelope 300 also includes an elongated rearward portion 306 which contains an electron gun generally designated 308 and associated electrodes which serve to develop, accelerate and focus a beam of electrons toward a wire cored glass fiber mosaic assembly generally designated 310.

In the practice of the present invention, a source of light indicated as an incandescent lamp 312, whose light is passed through a collecting lens system 314, is projected upon the inner face of the mosaic assembly 310 and light passing therethrough is projected upon a suitable screen 316 by a lens system 318. The screen 316 will depict interspersed areas of light and shadow which are determined directly by the light transmitted through a film of oil 320 maintained on the outer face 322 of the mosaic assembly 310.

Referring to FIG. 25, the simplest form of the light-controlling mechanism of the invention is illustrated. The mosaic assembly 310 comprises a plurality of mosaic elements each consisting of a fine wire core 12 surrounded by a transparent glass sleeve 20j having a high index of refraction, which glass sleeve is surrounded by a further glass sleeve 21j having a lower index of refraction. The mosaic assembly may be constructed substantially as shown and described with reference to FIGS. 3 and 4, with the spacing between the wires 12 being approximately .002 inch. The wire cored glass fiber mosaic assembly 310 provides for good transmission of light through the glass sleeves 20j and electric current through the wires 12.

When the mosaic assembly 310 is employed in the light controlling device, a light transmitting electrically conductive coating 324 is provided on the inner face 304 of the envelope 300 which electrically conductive light transmitting coating is connected to ground potential through a suitable conductor 326. As hereinbefore discussed, interposed between the inner wall 304 of the envelope 300 and the outer face 322 of the mosaic assembly 310 is a thin film of oil 320 which may be in the order of .001 inch thick. It is further pointed out that while the oil film 320 is isolated from the ambient atmosphere, the space between face 322 and the conductive light transmitting coating 324 is not maintained at low vacuum conditions as is required in the remainder of the envelope 312, thus eliminating the problem of maintaining a suitable oil film in a vacuum. In operation of the device, the cathode ray gun 308 is conventionally energized and the light source 312 is energized. Electrons from the electron gun 308 strike certain of the wires 12 which conduct a charge through the wires to the oil film 320. Wherever a charge is present on one or more of the wires, the oil film 320 thickens regardless of the direction of the field, this field being maintained by the charge on the wires and the grounded light transmitting electrically conductive coating 324. Where the oil film thickens, light from the source 312 is scattered and an image may then be projected by lens system 318 onto the screen 316.

Further control of the bunching of the oil film in the presence of an electrical field is provided by etching the mosaic illustrated in FIG. 25 as shown in FIG. 26. Referring to FIG. 26, the mosaic assembly 350 comprises a plurality of mosaic elements consisting of wire cores 12, a first concentric glass sleeve 20k and a second concentric glass sleeve 21k constructed as disclosed in FIG. 25 with the exception, however, that the wafer comprising the mosaic assembly 350 is etched and a metallic conductive button 352 is provided on each of the wires 12 and the webbing interconnecting the plural mosaic elements is provided with an electrically conductive metal coating or web 354. The conductive web 354 is suitably connected to ground potential through the conductor 326′. With this arrangement, a substantial potential may be maintained between the metallic buttons 352 and the metallic web 354 which increases the bunching of the oil film in the areas where a potential exists between the buttons 352 and the web 354. The bunched portions of the oil act as lenses which focus the light passing therethrough. Where no charge is present as indicated in the center cell, the oil film remains substantially flat and substantially all of the light is transmitted therethrough without decollimation.

Further improvements in the resolution of the projected image may be obtained by replacing the clear glass face 304 of the envelope 300 with a mosaic consisting of a plurality of glass fibers 354, each of which are surrounded by a concentric glass sleeve 356. The glass fibers 354 are clear glass while the concentric sleeves 356 are opaque, thereby reducing the area of the face plate through which light may pass and thereby sharpening the projected image. In this form of construction, it is necessary to align the mosaic assembly 358 consisting of the opaque and clear glass elements with the mosaic assembly 350′ in order to obtain the desired results. However, it will be appreciated that the aligning difficulties may be overcome by constructing the mosaic 358 of glass fibers, for example, 5 times finer than the mosaic elements of the mosaic assembly 350′, thereby insuring that a clear portion of the mosaic 358 is always aligned in the general vicinity of the light transmitting portions of the oil film 320.

From the foregoing description, it will be readily appreciated by those skilled in the art that the present invention provides substantial improvements in light controlling devices and that various modifications may be made in the form of the mosaic assemblies without departing from the scope of the present invention. For example, the mosaic assembly 358 may be replaced with a glass mosaic having substantially any size fibers with the glass of the fibers having a narrow light acceptance angle whereby only light within the range of the acceptance angle would pass through the mosaic.

*Memory storage unit employing an improved mosaic assembly*

Referring to FIGS. 28 and 29, there is illustrated a memory storage unit employing an improved wire cored glass fiber assembly of the invention. In the drawings, 400 generally designates an envelope having a pair of reduced opposed ends, each of which houses a conventional cathode ray type gun 402 and 404 and control means therefor. The end 406 is designated the information input end while "read-out" of the stored information is controlled by end 408.

Intermediate the ends of the envelope 400 is positioned an improved wire cored glass fiber assembly 410. The mosaic assembly 410 includes as more clearly shown in FIG. 29 of the drawings a plurality of mosaic elements, each consisting of a wire core 12 surrounded by a glass sleeve 20m which glass sleeve is surrounded by a further glass sleeve 21m. The composition of glasses 20m and 21m may be identical with the composition of glasses 20 and 21 illustrated in FIGS. 3 and 4 of the application with glass 20m being highly etchable and glass 21m being resistant to etching. A plurality of the mosaic elements are assembled into a homogeneous mosaic assembly, sliced, ground, polished and etched on both faces as hereinbefore described. One of the resulting honeycomb webs 412 is then coated with a conductive metallic coating 414 which is suitably connected to ground potential while the opposite honeycomb web 416 is coated with a similar metallic webbing 418 which webbing is connected to the output circuitry as illustrated in FIG. 28. The "read" end of each of the wires 12 is provided with a metallic button 420 selected to have good secondary electron emitting properties while the opposite ends, the "write" ends of each of the plural wires 12, is provided with a metallic button 422 having poor secondary electron emitting properties.

In operation, the signals representing the data to be stored are fed to the input cathode ray gun 402 and the electron beam thereof strikes selected buttons 422 placing a potential on the selected wires 12. Secondary electrons which may be emitted by buttons 422 and excess beam electrons which do not impinge upon the ends of the metal fibers are collected by the webbing 412 which is connected to ground potential, thus eliminating a charge buildup and interfiber coupling. The "write" electron beam builds up a negative charge upon selected wires 12 by supplying thereto an excess of electrons.

To "read" the stored data, the electron gun and control circuitry 404 is energized and when the reading beam of electrons impinge upon a cap 420 which has been negatively charged, the secondary electrons emitted therefrom flow to the positively charged grid electrode 418 providing an output pulse through conductor 426 which is connected to conventional electronic circuitry for transmission or to a suitable amplifier and printing circuit.

Referring to FIG. 29A, there is illustrated an improved wire cored glass fiber assembly 410′. Assembly 410′ is like assembly 410 shown in FIG. 29 and like elements are provided with primed reference characters.

Mosaic assembly 410′ consists of a plurality of mosaic elements, each of which consists of a wire core 12 surrounded by a glass sleeve 21m′ which glass sleeve is surrounded by a further glass sleeve 20m′. The composition of glasses 20m′ and 21m′ are identical to glasses 20m and 21m; however, it will be noted that their positions relative to wires 12 are reversed so that the webs formed by the highly etchable glass sleeves 20m′ are depressed in the mosaic 410′ whereas in FIG. 29, the webs project beyond the buttons 420 and 422.

As in the form of the invention shown in FIG. 29, the opposite ends of wires 12 are provided with conductive buttons 420′ and 422′ and the webs formed by glass sleeves 20m′ are provided with electrical conductive coatings 414′ and 418′.

In operation, the mosaic 410′ is identical with the operation of the mosaic 410 described with reference to FIGS. 28 and 29.

*Electrical image producing device*

Referring to FIGS. 30 through 34, there are illustrated devices employing the improved metal and glass mosaic assemblies of the invention which are useful in producing electrical images which, in turn, may be employed as reading aids for the blind or in conjunction with electrostatic printing devices as more fully described with reference to FIGS. 21, 22 and 23 of the application.

Referring particularly to FIGS. 30, 31 and 33, there is shown an embodiment of the invention generally designated 500 which includes an envelope 510 having a rear transparent window 512 and a pair of mosaic assemblies 514 and 516, enlarged fragmentary portions of which are shown in FIGS. 31 and 33, respectively.

The device 500 also includes an optical system illustrated as lens 518 in optical alignment with an object 520 to be projected on the rear face 522 of mosaic assembly 514.

The mosaic assembly 514 includes a plurality of mosaic elements, each consisting of a wire core 12 surrounded by a glass sleeve 20p, each of which sleeves is surrounded by a further glass sleeve 21p. The composition of the glasses 20p and 21p may be identical with the composition of the glasses 20 and 21 illustrated in FIGS. 3 and 4 of the application with glass 20p being highly etchable and glass 21p being resistant to etching. A plurality of the mosaic elements are assembled into a homogeneous mosaic assembly, sliced, ground, polished and etched on face 524 as hereinbefore described. The face 522, facing the optical system 518, is provided with an electrically conductive light-transparent tin oxide coating 526 which coating is connected to a source of electrical current 528 through conductor 530.

The web surrounding each of the plural wires 12 is provided with an electrically conductive coating 532 which electrical conductive coating is maintained at a potential differing from that connected to the electrical conductive and light-transparent coating 526 by lead 534 also connected to the source of electrical energy 528.

Each of the wires 12 and a portion of the glass sleeves 20p surrounding the wires are coated with a photoemissive material generally designated 536. With this arrangement light from the optical system 518 is projected onto the electrically conductive and light-transparent coating 526 and the light passing through the light channels formed by glass sleeves 20p strikes the photoemissive coating 536 which, in turn, emits electrons. Some of the electrons are captured by the conductive coating 532 while the greater portion of emitted electrons travel toward cooperating mosaic elements of the mosaic assembly 516.

Referring particularly to FIG. 32, the mosaic assembly 516 comprises a plurality of fine wires 12, each surrounded by a glass sleeve 20u. Each of the glass sleeves 20u is, in turn, surrounded by a glass sleeve 21u. The composition of glasses 20u and 21u are identical with glasses 21p and 20p hereinbefore described with reference to FIG. 31. A plurality of the mosaic elements are assembly into a homogeneous mosaic assembly, sliced, ground, polished and etched on one face 540 which face is in opposed relationship to face 524 of mosaic assembly 514.

The web formed by etching face 540 is provided with an electrically conductive coating 542 which electrically conductive coating is connected by conductor 544 to the other terminal of the source of electrical energy 528. The etched ends of each of the wires 12 and at least a portion of each of the glass elements 20u surrounding each of the wires is provided with a metallic button or coating 546 whereby electrons from the photoemissive coating 536 of electrical optical mosaic 514 are collected on the buttons 546 and conducted through the wires 12 to the outer face of the mosaic assembly 516. With this arrangement of structures, an image of the object 520 is transferred to the outer surface 548 in the form of a plurality of electrical charges. The device may be utilized as a reading aid for the blind as the light electrical charges on selected wires 12, which as illustrated in FIG. 34 may form characters such as the letters A–X corresponding to indicia on the object 520. By removing the charge from the face 548 with the tips of the fingers, a person may translate the electrical image into a mental image of the indicia on the object 520.

A further form of the invention is illustrated in FIG. 32 where the object to be translated into an electrical image on the face of a mosaic assembly is produced by means of a conventional cathode ray tube generally designated 550. The cathode ray tube 550 includes an electron emitting and controlling device 552 connected to, for example, a conventional closed television circuit. The opposite end or face end of the tube 554 comprises the mosaic assembly 516 illustrated in FIG. 33 whereby electrons from the cathode ray gun 552 striking certain of the buttons 546 produce electrical charges on said wires 12 which, in turn, is conducted through the glass sleeves 20u to the outer face of the cathode ray tube. Secondary electrons emitted from the buttons 546, which should have poor secondary electron emitting properties, are collected by the electrically conductive web 542 which, in turn, is connected to ground. As in the form of the invention described with reference to FIG. 30, the electrical image thus reproduced on the surface 548 of the wires 12 may be employed as a reading aid for the blind.

I claim:

1. A metal and glass fiber mosaic assembly consisting of a plurality of metal and glass elements, each of said elements including a wire and at least a pair of glass members, at least one of said glass members forming a glass sleeve about said wire and the other of said pair of glass members, the outer surface of each of said one glass members being fused into a continuous glass matrix with the longitudinal axis of each of the wires lying generally parallel, at least one end of at least one of said glass members projecting beyond the level of the other glass member of each of said metal and glass elements.

2. A metal and glass fiber mosaic assembly consisting of a plurality of metal and glass elements, each of said elements including a wire and at least a pair of glass members, at least one of said glass members forming a glass sleeve about said wire and the other of said pair of glass members, the outer surface of each of said one glass members being fused into a continuous glass matrix with the longitudinal axis of each of the wires lying generally parallel, at least one end of each of said glass sleeves projecting beyond the other of the glass members of each of the metal and glass elements to provide a continuous surface about and projecting beyond the level of each of the other of the glass members of each of said pair of glass members.

3. A metal and glass fiber mosaic assembly consisting of a plurality of metal and glass elements, each of said elements including a wire and at least a pair of glass members, at least one of said glass members forming a glass sleeve about said wire and the other of said pair of glass members, the outer surface of each of said one glass members being fused into a continuous glass matrix with the longitudinal axis of each of the wires lying generally parallel, at least one end of each of said glass sleeves being depressed inwardly of the other of the glass members of each of the metal and glass elements to provide a continuous depressed surface about each of the other of the glass members of each of said pair of glass members.

4. A metal and glass fiber mosaic assembly consisting of a plurality of metal and glass elements, each of said elements including a wire and at least a pair of glass members, at least one of said glass members forming a glass sleeve about said wire and the other of said pair of glass members, the outer surface of each of said one glass members being fused into a continuous glass matrix with the longitudinal axis of each of the wires lying generally parallel, at least one end of at least one of said glass members projecting beyond the level of the other glass member of each of said metal and glass elements, and at least one of said glass members providing a light conducting channel through each of said metal and glass elements of the mosaic assembly.

5. A metal cored glass fiber mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, at least one end of at least one of said sleeves of each of said pair of sleeves projecting beyond the level of the other sleeve of each of said pair of sleeves.

6. A metal cored glass fiber mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, at least one end of the outermost sleeve of each of said pair of sleeves projecting beyond the other of said sleeves of each of said pair of sleeves to provide a continuous surface about and projecting beyond the level of each of the other of said sleeves of each of said pair of sleeves.

7. A metal cored glass fiber mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, at least one end of the outermost sleeve of each of said pair of sleeves projecting beyond the other of said sleeves of each of said pair of sleeves to provide a continuous surface about and projecting beyond the level of each of the other of said sleeves of each of said pair of sleeves and an electrically conductive coating on said continuous surface.

8. A metal cored glass fiber mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, at least one end of the outermost sleeve of each of said pair of sleeves projecting beyond the other of said sleeves of each of said pair of sleeves to provide a continuous surface about and projecting beyond the level of each of the other of said sleeves of each of said pair of sleeves, an electrically conductive coating on said continuous surface and on at least a portion of said other sleeves of each of said pair of sleeves.

9. A metal cored glass fiber mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, at least one end of the outermost sleeve of each of said pair of sleeves projecting beyond the other of said sleeves of said pair of sleeves to provide a continuous surface projecting beyond the other sleeve of each of said pair of sleeves, an electrically conductive coating on said continuous surface, a further electrically conductive coating on the other end of said mosaic assembly, and another electrically conductive coating on at least a portion of said one end of the other of said sleeves of each of said pair of sleeves and in contact with the metal core thereof.

10. A metal cored glass fiber mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, one end of the outermost sleeve of each of said pair of sleeves projecting beyond the inner sleeve of each of said pair of sleeves to provide a continuous surface projecting beyond the inner sleeve of each of said pair of sleeves, an electrically conductive coating on said continuous surface, an electrically conductive and light transparent coating on the other end of said mosaic assembly, and a further electrically conductive coating on at least a portion of said one end of the other of said sleeves of each of said pair of sleeves and in contact with the metal core thereof.

11. A metal cored glass fiber mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, at least one end of the outermost sleeve of said pair of sleeves projecting beyond the other of said sleeves of said pair of sleeves to provide a continuous surface projecting beyond said other of said sleeves of said pair of sleeves, an electrically conductive coating on said continuous surface, and a photoemissive coating on said metal core and at least a portion of the other of the sleeves of each of said pairs of sleeves.

12. An image reproducing means comprising an envelope, an electron beam emitting and controlling device at one end of said envelope, a metal cored glass fiber mosaic assembly mounted in said envelope and spaced from said electron beam emitting and controlling device, said mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves, the electron beam emitting side of the outermost sleeve of said pair of sleeves projecting beyond the other of said sleeves of said pair of sleeves, an electrically conductive coating on the projecting surfaces of said outermost sleeves, a photoemissive material coated on each of the metal cores and at least a portion of the other of the glass sleeves facing said electron beam emitting device, and an electrically conductive and light transparent coating on said other side of the mosaic assembly, and separate electrical conductor means connecting said electrically conductive coating and said electrically conducting and light transmitting coating to connection points outside of said envelope.

13. An image reproducing means comprising an envelope, an electron beam emitting and controlling device at one end of said envelope a metal and glass fiber mosaic assembly mounted in said envelope and spaced from said electron beam emitting and controlling device, said mosaic assembly comprising a plurality of metal wires and glass elements, the outer surface of each of said glass elements being fused into a continuous matrix with the longitudinal axis of each of the wires lying generally parallel, each of said elements including a wire and three concentric glass members, the outermost member of each of said elements projecting beyond the other of said members of each of said elements at the end of the mosaic assembly facing the electron beam emitting and controlling device, an electrically conductive coating on said projecting member of each of said elements, an electrically conductive and light transparent coating on the opposite face of said mosaic assembly, the innermost glass member of each of the elements projecting beyond the center glass member of each of said elements, a metallic coating on said projecting surface of said center member, and a photoemissive material coated on the face of the remaining glass member at the end of the assembly facing the electron emitting and controlling device.

14. An image reproducing means comprising an envelope, a light transparent window at one end of said envelope, a metal cored glass fiber mosaic assembly mounted in said envelope, said mosaic assembly comprising a plurality of metal cored glass elements, the outer surface of each said metal cored glass elements being fused into a continuous matrix with a longitudinal axis of each of the metal cores lying generally parallel to each other and normal to said transparent window in said envelope, each of said elements including at least a wire core and a pair of concentric glass sleeves, the outermost sleeve of each of said elements projecting beyond the other of said sleeves at the end of said assembly facing said transparent window, an aluminum backed phosphor coating on said window, an electrically conductive light transparent coating on the opposite end of the mosaic assembly, an electrically conductive coating on the projecting sleeve of each of said pair of sleeves of each of said elements, and a photoemissive coating on each of the wire cores and on at least a portion of each of their adjacent glass sleeves of the end of the member facing said phosphor.

15. An image reproducing means comprising an envelope, a light transparent window at one end of said envelope, a metal cored glass fiber mosaic assembly mounted in said envelope, said mosaic assembly comprising a plurality of metal cored glass elements, the outer surface of each said metal cored glass elements being fused into a continuous matrix with the longitudinal axis of each of the metal cores lying generally parallel to each other and normal to said transparent window in said envelope, each of said elements including at least a wire core and a pair of concentric glass sleeves, the outermost sleeve of each of said elements projecting beyond the other of said sleeves at the end of said assembly facing said transparent window, an aluminum backed phosphor coating on said transparent window, an electrically conductive light transparent coating on the opposite end of the mosaic assembly, an electrically conductive coating on the projecting sleeve of each of said pair of sleeves of each of said elements, and a photoemissive coating on each of the wire cores and on at least a portion of each of their adjacent glass sleeves of the end of the member facing said phosphor, a conductive plate positioned between the phosphor and said mosaic assembly and an opening in said plate aligned with each of said wire cores of each of the elements of said mosaic assembly.

16. An image reproducing means comprising an envelope, a light transparent window at one end of said envelope, a metal cored glass fiber mosaic assembly mounted in said envelope, said mosaic assembly comprising a plurality of metal cored glass elements, the outer surface of each said metal cored glass elements being fused into a continuous matrix with a longitudinal axis of each of the metal cores lying generally parallel to each other and normal to said transparent window in said envelope, each of said elements including at least a wire core and a pair of concentric glass sleeves, the outermost sleeve of each of said elements projecting beyond the other of said sleeves at the end of said assembly facing said transparent window, an aluminum backed phosphor coating on said transparent window, an electrically conductive light transparent coating on the opposite end of the mosaic assembly, an electrically conductive coating on the projecting sleeve of each of said pair of sleeves of each of said elements, and a photoemissive coating on each of the wire cores and on at least a portion of each of their adjacent glass sleeves of the end of the member facing said phosphor, and an assembly of glass tubes positioned between the phosphor and said metal cored glass fiber mosaic assembly.

17. An electrostatic printing device comprising an envelope, one wall of said envelope comprising a metal cored glass fiber mosaic assembly including a plurality of metal cored glass fiber elements, the outer surface of each of said metal cored glass fiber elements being fused into a continuous matrix with the longitudinal axis of each of the metal cores lying generally parallel, each of said elements including at least a wire core and a pair of concentric glass sleeves, at least one end of the outer sleeve of each of said pair of sleeves projecting beyond the level of the other of said sleeves of each of said pair of sleeves to provide a continuous glass web projecting outwardly about each of said wire cores, an electrically conductive coating on said glass web, an electrically conductive coating on the wire core and at least a portion of said other of said glass sleeves on said one face of said mosaic assembly, a conductive plate having an extended surface parallel to said mosaic assembly and spaced therefrom, a dielectric writing medium, means for passing said dielectric writing medium between the mosaic assembly and said metal plate, means for producing a high potential field between said metal cores of said mosaic assembly and the metal plate, and means for directing radiant energy toward said mosaic assembly on the opposite side thereof from said dielectric writing medium.

18. An electrostatic printing device comprising an envelope, an electron beam emitting and controlling device at one end of said envelope, a metal cored glass fiber mosaic assembly positioned at the other end of said envelope, means for passing a dielectric writing medium adjacent the face of the mosaic assembly remote from said electron beam emitting and controlling device, a metal plate substantially coextensive with said mosaic assembly positioned adjacent the face of the dielectric writing medium remote from the mosaic assembly, means for maintaining a high potential electrical field between said mosaic assembly and the metal plate, said mosaic assembly comprising a plurality of metal cored glass elements, the outer surface of each of said metal cored glass elements being fused into a continuous matrix with the longitudinal axis of each of the metal cores lying generally parallel and normal to the plane of the metal plate, each of said elements including at least a wire core and a pair of concentric glass sleeves, at least one end of the outermost sleeve of said pair of glass sleeves projecting beyond the other of said sleeves of each of said pair of sleeves to provide a continuous glass web projecting beyond each of said wire cores, a coating on each of said wire cores and at least a portion of the other of said glass sleeves, said coating on said metal cores comprising a poor secondary electron emitter.

19. The invention defined in claim 18 wherein the coating on said metal cores faces said electron beam emitting and controlling device.

20. An electrostatic printing device comprising an envelope, an electron beam emitting and controlling device at one end of said envelope, a metal cored glass fiber mosaic assembly positioned at the other end of said envelope, means for passing a dielectric writing medium adjacent the face of the mosaic assembly remote from said electron beam emitting and controlling device, a metal plate substantially coextensive with said mosaic assembly positioned adjacent the face of the dielectric writing medium remote from the mosaic assembly, means for maintaining a high potential electrical field between said mosaic assembly and the metal plate, said mosaic assembly comprising a plurality of metal cored glass elements, the outer surface of each of said metal cored glass elements being fused into a continuous matrix with the longitudinal axis of each of the metal cores lying generally parallel, each of said elements of said assembly including at least a wire core and a plurality of concentric glass sleeves, at least one end of the outermost sleeve of said pair of sleeves of said assembly projecting beyond the other of said sleeves of each of said elements of said assembly to provide a continuous glass web projecting beyond the wire cores of said assembly, an electrical discharge point on each of the outermost sleeves of each of said pair of sleeves, an electrically conductive coating on said web of said assembly including said discharge point, means connecting said conductive coating to a source of pulsating electric current, said mosaic assembly being positioned in said envelope with the electrical discharge points directed away from the electron beam emitting and controlling device.

21. A light controlling device comprising an envelope, a pair of opposed light transparent windows in said envelope, a metal cored glass fiber mosaic assembly within said envelope adjacent one of said windows, an electron beam emitting and control device positioned in said envelope and adapted to direct a beam of electrons to the face of the mosaic assembly opposite to said one window, means for directing a beam of light through the other window to said face of said mosaic assembly, a dielectric liquid film on the opposite face of the mosaic assembly, said mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves with said wire cores lying generally normal to the plane of said transparent windows in the envelope.

22. A light controlling device comprising an envelope, a pair of opposed light transparent windows in said envelope, a metal cored glass fiber mosaic assembly within said envelope adjacent one of said windows, an electron beam emitting and control device positioned in said envelope and adapted to direct a beam of electrons to the face of the mosaic assembly opposite to said one window, means for directing a beam of light through the other window to said face of said mosaic assembly, a dielectric liquid film on the opposite face of the mosaic assembly, said mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves with said wire cores lying generally normal to the plane of said transparent windows in the envelope, the outermost sleeve of said pair of sleeves adjacent the liquid film projecting beyond the other of said sleeves and said wire cores to provide a continuous web of glass about and spaced from said wire cores, an electrically conductive coating on said web, and a further electrical conductive coating on each of said wire cores and a portion of the other glass sleeve adjacent the liquid film.

23. A light controlling device comprising an envelope, a pair of opposed light transparent windows in said envelope, a metal cored glass fiber mosaic assembly within said envelope adjacent one of said windows, an electron beam emitting and control device positioned in said envelope and adapted to direct a beam of electrons to the face of the mosaic assembly opposite to said one window, means for directing a beam of light through the other window to said face of said mosaic assembly, a dielectric liquid film on the opposite face of the mosaic assembly, said mosaic assembly comprising a plurality of metal cored glass elements, the outer surface of each of said metal cored glass elements being fused into a continuous matrix with the longitudinal axis of each of the metal cores lying generally parallel, each of said elements including at least a wire core and a pair of concentric glass sleeves with said wire cores lying generally normal to the plane of said transparent windows in the envelope, the outermost sleeve of said pair of sleeves adjacent the liquid film projecting beyond the other of said sleeves and said wire cores to provide a continuous web of glass about and spaced from said wire cores, an electrically conductive coating on said web, a further electrical conductive coating on each of said wire cores and a portion of the other glass sleeve adjacent the liquid film and further light controlling means on the opposite side of said liquid film from said metal cored glass fiber mosaic assembly.

24. A data storage unit comprising an envelope, an electron beam emitting and control device at opposite ends of said envelope, a metal cored glass fiber mosaic assembly positioned in said envelope between said electron beam emitting and control devices, said mosaic assembly comprising a plurality of metal cored glass fiber elements, the outer surface of each of said metal cored glass fiber elements being fused into a continuous matrix with the longitudinal axis of each of the metal cores lying generally parallel, each of said elements including at least a wire core and a pair of concentric glass sleeves, opposite ends of said wire cores generally directed toward said electron beam emitting and control devices, both ends of the outermost sleeve of each of said pair of sleeves of the mosaic elements projecting beyond the other of said sleeves and said wire cores to provide a continuous glass web surrounding and projecting beyond each of said wire cores at each end of the assembly, an electrically conductive coating on each of said glass webs, and a further coating on each end of each of said wire cores and at least a portion of the adjacent glass sleeves, and separate conductor means connected to each of the electrically conductive coatings on said continuous webs.

25. The invention defined in claim 24 wherein the coating on one end of each of said wire cores is a poor secondary electron emitter and said coating on the opposite end of each of said wire cores is a good secondary electron emitter.

26. An electrical image producing device comprising an envelope, a metal cored glass fiber mosaic assembly in said envelope, said assembly including a plurality of metal cored glass fiber elements, the outer surface of each of said metal cored glass fiber elements being fused into a continuous matrix with the longitudinal axis of each of the metal cores lying generally parallel, each of said elements including at least a wire core and a pair of concentric glass sleeves, at least one end of the outer sleeve of each of said pair of sleeves projecting beyond the level of the other of said sleeves of each of said pair of sleeves to provide a continuous glass web projecting outwardly about each of said wire cores, an electrically conductive coating on said glass web, an electrically conductive coating on each of the wire cores and at least a portion of said other of said glass sleeves on said one face of said mosaic assembly, and means for directing an electrical current to the conductive coating on selected of said wire cores.

27. The invention defined in claim 26 wherein the means for directing an electrical current to the conductive coating on selected of said wire cores comprises an electron beam emitting and controlling device.

28. The invention defined in claim 26 wherein the means for directing an electrical current to the conductive coating on selected of said wire cores comprises a further mosaic assembly.

References Cited by the Examiner
UNITED STATES PATENTS

| | | | |
|---|---|---|---|
| 1,641,932 | 9/1927 | Reece | 49—86 |
| 2,261,262 | 11/1941 | Lewis | 49—86 |
| 2,277,009 | 3/1942 | Von Ardenne | 313—91 |
| 2,324,505 | 7/1943 | Iams et al. | 313—329 |
| 2,467,734 | 4/1949 | Essig | 313—329 |
| 2,619,438 | 11/1952 | Varian et al. | 148—4 |
| 2,846,604 | 8/1958 | Flory | 313—68 |
| 2,873,398 | 2/1959 | Crost | 313—66 |
| 2,928,973 | 3/1960 | Crews | 313—89 |
| 3,140,528 | 7/1964 | Hildebrand et al. | 29—25.14 |

FOREIGN PATENTS 507,711   9/1920   France.

GEORGE N. WESTBY, *Primary Examiner.*